United States Patent [19]

Pavel

[11] 4,412,106

[45] Oct. 25, 1983

[54] HIGH FIDELITY STEREOPHONIC REPRODUCTION SYSTEM

[76] Inventor: Andreas Pavel, Via Visconti di Modrone 14/A, Milan, Italy

[21] Appl. No.: 265,124

[22] Filed: May 19, 1981

Related U.S. Application Data

[63] Continuation of Ser. No. 47,967, Jun. 12, 1979, abandoned, which is a continuation-in-part of Ser. No. 889,664, Mar. 24, 1978, abandoned.

[30] Foreign Application Priority Data

Mar. 24, 1977 [IT] Italy ............................... 21625 A/77

[51] Int. Cl.³ ............................................. H04B 1/04
[52] U.S. Cl. .................................... 179/156 R; 369/4; 369/69; 455/89; 455/100
[58] Field of Search ...................... 455/89, 100; 369/4, 369/5, 69, 70; 360/93; 179/1 VE, 1 R, 1 A, 156 R, 156 A, 1 P

[56] References Cited

U.S. PATENT DOCUMENTS

| | | | |
|---|---|---|---|
| 2,285,083 | 6/1942 | Cover, Sr. ........................ | 455/100 X |
| 3,586,977 | 6/1971 | Lustig et al. ...................... | 455/89 X |
| 3,983,483 | 9/1976 | Pando .................................... | 455/89 |
| 4,132,861 | 1/1979 | Frieder, Jr. et al. ........... | 179/156 A |

*Primary Examiner*—R. J. Hickey
*Attorney, Agent, or Firm*—William A. Drucker

[57] ABSTRACT

An audio system for portable high fidelity reproduction, to provide a sensation of being surrounded by a three-dimensional field of lifelike sound events, comprises a set of miniaturized electro-acoustical devices adapted to each other and for battery-operated high fidelity reproductions and designed to be supported by or built into an interconnecting belt-like garment, so as to be worn in contact with the listener's body without causing any discomfort or encumbrance. The system may further employ one or more pairs of small-size binaural transducers with open-air high fidelity characteristics, and its circuitry is designed for binaural radiation and for optimal frequency response and perfect space reproduction through a given transducer type.

17 Claims, 4 Drawing Figures

HIGH FIDELITY STEREOPHONIC REPRODUCTION SYSTEM

This is a continuation of Ser. No. 47,967 filed June 12, 1979, now abandoned, which is a continuation-in-part of my co-pending U.S. patent application Ser. No. 889,664 filed Mar. 24, 1978, now abandoned.

BACKGROUND OF THE INVENTION

Devices for the reproduction of music and other sounds, either broadcast or reproduced from magnetic tape or disc, are increasingly popular forms of recreation and cultural development. High fidelity stereophonic systems, in particular, have grown into a form of mass leisure and become the basis of a strongly growing audio industry.

The present invention relates generally to audio reproduction systems, and particularly to systems of the high fidelity type, which are essentially concerned with the faith-full re-creation of sound events or, more exactly, with a re-creation of sound sensations that is as close as possible to the sound sensations that a listener would have received at the place and time of the original events, with regard to frequency range, dynamics, impulse behavior, noise, distortion (or shortly, sound quality) and, most of all, in the case of stereophonic systems, with the local (space) and temporal (phase, delay) determinants of the sound sensations. Totally, high fidelity stereophonic systems should be able to provide the whole depth and detail that the human ear can detect in the presence of original sound events. Such a task, obviously, can only be achieved through the use of particular and partly complex high fidelity technologies.

The invention relates further to battery-operated radio-cassette devices of stereophonic though not high fidelity type and to automobile stereo sound systems, both of which are presently showing a strong growth in quantity as well as quality.

The invention relates finally to high fidelity headphone applications and to the art of binaural stereophonic reproduction in general.

THE PRIOR ART

High fidelity stereophonic reproduction systems prior to this invention have been made to be operated and listened to in predetermined fixed settings, usually closed rooms, in which they are installed and connected to a power source. Reproduction by such systems is handicapped in that it is restricted to the location at which they are set up.

Battery-operated stereophonic systems, on the other hand, have hitherto been unable to provide a realistic reproduction of musical sounds. They lack the wide and even frequency response, timbristic detail, and spatial depth given by true high fidelity systems, which operate through relatively voluminous and energy consuming loudspeaker boxes and have always been connected to a power source much stronger than portable batteries.

The poor reproduction of prior art battery-operated stereophonic systems is aggravated at open locations, where the absence of reflected sound further weakens the sound pressure level that reaches the listener, particularly in the lower frequency range. The listener to such devices is far from getting a feeling of realistic presence and illusion. Additionally, such systems are socially inconvenient in public places and wherever they disturb other people.

Prior stereophonic portables are ineffective and disturbing, for instance, on a beach, in a garden, in the subway, or at a camping site, and incompatible with certain outdoor activities, like skiing and motorcycle riding. Moreover, they are a constant hindrance during transportation, being an uncomfortable commitment for at least one hand, arm, or shoulder, and interfering with bodily movements. They are box-like configurations based on loudspeaker reproduction, having a speaker on each side, to be used in a resting position rather than during transportation. Because such systems are made, in other words, for reproduction in basically fixed (though variable) positions and inside private environments, they are portable only in a very limited sense. U.S. Pat. No. 4,081,850, issued to R. Walden in March 1978, introduces a portable tape player, radio and tape container, to be used during transportation; yet it is ineffective for this purpose because it protrudes forward and backward from the user's body, strains the shoulder, would tend to slide down from it, and would be subject to pendular movement; it is also incompatible with stereophonic reproduction because both speakers are at the same side of the listener; and it is, like other battery portables, socially disturbing and not a high fidelity reproduction system.

In addition to the battery-operated radio-cassette players, provided with two or more loudspeakers for portable stereophonic reproduction, which are rather cumbersome and ineffective, there have been high fidelity stereophonic tape recorders adapted for battery operation, which are designed essentially for tape recording, and are equipped with only one loudspeaker, if at all, and a low voltage headphone output, included for monitoring purposes. Such instruments comply with high fidelity standards in recording, but not in battery-operated reproduction; they only provide high fidelity reproduction in combination with a mains-powered domestic installation.

It should be noticed that prior art stereophonic reproduction systems, both of the high fidelity and of the battery portable type, are basically conceived, shaped, and equipped for loudspeaker reproduction—thus taking no account of the fact that binaural reproduction, through high fidelity headphones, is far more capable of delivering an accurate reproduction of sound sensations.

Binaural reproduction systems are independent from room acoustics and work with much smaller masses, with full separation between the left and the right ear; for these reasons they have a much better ability than loudspeakers to reproduce the acoustic quality and space of sounds. Unfortunately, most prior art binaural systems keep the listener attached to a card running between a pair of headphones and a program source, which is either a fixed high fidelity system, or a portable stereophonic system, away from the listener's body and usually played in a resting position. Alternatively, prior art binaural systems make use of a transmitter-receiver apparatus for the cordless link between the headphones and the program source—but such systems still restrict the listening area, usually to the narrow radius of a few rooms. They also keep the control center in a separate and fixed position and they are subject to interference and noise. Earphones have been used in some portable communications devices without limitations of the user's mobility, for instance by Pando, U.S. Pat. No.

3,983,483 of 1976, and by Cover, U.S. Pat. No. 2,285,083 of 1942, but such applications have been unrelated to binaural high fidelity principles and to the outstanding potential of headphones and related circuitry for undistorted frequency response and accurate stereophony. In fact, they have been unrelated to the reproduction of music and of stored program signals.

Prior art binaural systems, even of the open-air type, also tend to isolate the listener from his acoustic environment, making it much more difficult to monitor ongoing events or engage in conversations during reproduction than with loudspeaker systems.

Most of all, conventional stereophonic units, being essentially conceived and designed for loudspeaker reproduction, usually include no more than simple modifications for headphone reproduction, rather than active headphone amplifiers of high fidelity type, because headphone reproduction is taken as an accessory function for no more than sporadic use. High fidelity headphone circuits have only been known in mains-powered and usually separate units, most often designed for the operation of electrostatic headphones. Headphone outputs of present day amplifiers, receivers and tape recorders are usually low voltage preamplifier outputs or simple resistor networks at loudspeaker power outputs. The design, impedance, and amplification of the active circuitry of said instruments is not adequate for high fidelity binaural reproduction, and much less for optimal reproduction through a predetermined headphone type.

Existing high fidelity amplifiers, inasmuch as they are not designed for a predetermined headphone type, also do not include accurate low volume compensation because the sensitivity of the transducers is unknown, and they cannot be provided with the necessary equalization circuits for accurate out-of-the-head loudspeaker simulation and for undistorted reproduction of eardrum signals because the frequency response of the used transducer system is equally unknown. Finally, binaural reproduction has naturally suffered from a lack of tactile reproduction, in particular from a lack of low frequency transmission to the listener's body.

In short:
(1) prior art high fidelity systems are not portable during reproduction, and are made to be used in listening rooms;
(2) prior art battery-operated stereophonic systems do not provide high fidelity reproduction and are portable only in a very limited sense;
(3) prior art binaural reproduction systems, which comprise headphone transducers in connection with (1) or (2) above, also limit the listener's mobility, most often by attaching him to a cord, and do not usually include matching circuitry for binaural high fidelity.

No effective solution for the high fidelity reproduction of music and other sound sensations has been offered heretofore without implying a simultaneous impediment to the listener's freedom of movements and choice of environments.

It should be noticed that such a situation has persisted to this moment in spite of strong and growing trends toward:
(a) high fidelity systems,
(b) miniaturized reproduction devices,
(c) portable stereophonic reproduction,
(d) automobile hifi stereo systems,
(e) portable hifi stereo recording systems,
(f) headphone reproduction.

Because of the lack of an effective solution for portable high fidelity reproduction, the peculiar sensation of listening to a realistic, three-dimensional reproduction of music under the open sky, as well as in a variety of other situations and activities, has been generally unavailable to this date.

The applicant is aware of:
(1) U.S. Pat. No. 4,081,850: portable tape player and tape container, Richard Walden, 1978.
(2) U.S. Pat. No. 3,983,483: communications device arranged to be worn in intimate contact with the body of a user, Donald Pando, 1976.
(3) U.S. Pat. No. 2,285,083: two-way radio garment, Berkey Cover, 1942.
(4) U.S. Pat. No. 3,920,904: method and apparatus for imparting to headphones the sound reproduction characteristic to loudspeakers. Inventors: Jens Blauert & Peter Laws. Assignee: Eugen Beyer Elektrotechnische Fabrik, Heilbronn, German Federal Republic.
(5) GBM 7,509,223 (German Federal Republic): anordnung zur fixierung von außenohr-meßmikrophonen am kopf. Eugen Beyer Elektrotechnische Fabrik.
(6) U.S. Pat. No. 3,962,543: method and arrangement for controlling the acoustic output of earphones in response to rotations of listener's head. Inventors: Jens Blauert, Georg Boerger, Peter Laws. Assignee Eugen Beyer Elektrotechnische Fabrik.

OBJECTS OF THE INVENTION

The main and essential object of the present invention is to provide a stereophonic reproduction system providing high fidelity reproductions together with a practically unlimited mobility for the listener.

Another object is to provide a system of the type described above allowing for private listening without acoustic isolation of the listener in any degree, unless wanted.

Another object is to provide a system of the type described above allowing for individualized reproduction of a recorded program without restrictions to the number of listeners.

Another object is to provide a system of the type described above allowing for out-of-the-head location of reproduced sound sensations and for high precision stereophonic reproduction from probe microphone recordings of eardrum or earchannel signals.

Another object is to provide a system of the type described above allowing for the simulation of room acoustics.

Another object is to provide a system of the type described above including means to offset the rotational shift of sound reproductions caused by the listener's head movements.

Another object is to provide a system of the type described above allowing for undistorted frequency response at normal and high volumes and automatic loudness compensation at low volumes.

Another object is to provide a system of the type described above allowing for tactile bass reproduction at certain points of the listener's body.

Another object is to provide a system of the type described above allowing for live amplification of sound events as well as for the mixing and simultaneous amplification of different signal sources.

Another object is to provide a system of the type described above, allowing for sound reproductions of greater quality and realism than the very best conventional high fidelity system operating with fixed loudspeaker installations.

Another object is to provide a system of the type described above, offering high quality audio reproduction at considerably lower cost than conventional high fidelity systems operating through loudspeakers and using heavy power amplifiers.

Another object is to provide a battery-operated stereophonic reproduction system that is more portable than previous stereophonic portables and causes no social disturbance, yet is able to play at louder volumes and convey a stronger sense of stereophonic space and realism.

Another object is to provide a system of the type described above allowing for high fidelity reproduction inside mobile units such as a car, while also allowing for the same kind of reproduction outside and independently of such units.

Another object is to provide a system of the type described above allowing for highly realistic yet unencumbering stereophonic reproductions in an unlimited number of situations, activities, and motion states, such as walking, sitting, running, dancing, skiing, mountain climbing, camping, cooking, lawn moving, working at a machine or at a desk, and riding, driving or being transported by a vehicle like a train, bus, motorcycle, bicycle, boat, airplane, hangglider, etc.

Another object is to provide a system of the type described above, allowing the listener to experience the peculiar audiovisual stimulation that results from the association of musical sequences with a flow of changing images and environments as perceived in the cinema or by a person in motion.

Another object is to provide a cordless headphone system in which the cord attachment of the listener is eliminated by securing a suitably conceived high fidelity source on the listener himself, thus attaining unrestricted mobility in an unlimited listening area.

Another object is to provide a perfect binaural reproduction system, having none of the major handicaps of previous headphone arrangements, such as physical discomfort, acoustic isolation, in-the-head location, lack of tactile bass sensations, and restriction of the number of listeners.

Another object is to provide a system of the type described above including means that allow for electronic sound synthesizing.

Another object is to provide a system of the type described above comprising means to pick up some of the listener's physiological parameters and convert them into audio signals suitable for biofeedback training.

Another object is to provide a system of the type described above which is at the same time a ready-to-use recording and mixing system, with microphones and headphones always in place for the instant recording and monitoring of live sound events.

Another object is to provide a system of the type described above allowing for the stereophonic recording of live sound events in synchronization with the simultaneous recording of live images of the same events through cinematographic or electronic means.

SUMMARY OF THE INVENTION

The present invention contemplates a stereophonic reproduction system that is able to provide high fidelity reproduction of sounds while allowing for a practically unlimited mobility of the listener. The invention eliminates the need for a fixed installation of high fidelity reproduction systems through the combination and mutual adaptation of several electroacoustical devices, adequately miniaturized and shaped for integration into a supporting and interconnecting belt-like garment, to be worn by the listener. The present stereophonic system is able to provide sound reproductions as accurate as the very best arrangements of previous high fidelity art, yet it does not restrict the listener to a listening area nor interfere with his bodily movements. The invention is superior to all previous high fidelity arrangements in that it combines the advantage of binaural stereophony with those of loudspeaker reproduction. It is able to avoid, in other words, all the major shortcomings of previous stereophonic arrangements functioning with loudspeaker or headphone reproduction, as indicated in parenthesis below, and which are:

(a) restriction of the reproduction to a listening room (loudspeakers) or to a listening area (cordless headphone systems), (b) attachment of the listener to a cord (ordinary headphone systems), (c) interference of listening room acoustics with frequency response and time-delay characteristics of the reproduction (loudspeakers), (d) in-the-head location and front/back inversion of reproduced sound events (headphones), (e) disturbance of unwanted listeners (loudspeakers), (f) acoustic isolation of the listener (headphones), (g) lack of accurate stereophoney—including a lack of vertical positioning, of proximity gradations, of detail in left/right positioning and, with the usual two channels, also of front/back distribution of sound events (loudspeakers), (h) absence of tactile bass transmission to the listener's body (headphone reproduction).

The invention comprises at least and essentially a high fidelity stereophonic playback device such as a magnetic tape player, two signal amplifiers designed for binaural high fidelity reproduction and optimal response through a given headphone type, high fidelity headphones with lightweight open-air characteristics having electrical specifications which match the amplifier output in terms of impedance and sensitivity, a battery power supply, cable connections of adequate length between these devices, and a belt-like garment, or a garment with a belt-like element, shaped and equipped to support the above noted elements so as to eliminate pendular movements of the apparatus, pressure spots on the user's body, and protrudance away from it, while displaying all controls and read-outs in easy reach of hand and view.

In its most effective and preferred embodiment the invention further includes preamplifying control and switching circuitry comprising balance and tone controls, a high fidelity FM broadcast receiver and stereo decoder, a radio antenna fixed on or built into the belt, a set of at least two miniature microphones with microphone amplifiers and stereophonic mixing circuitry for the simultaneous reproduction of program materials and environmental sounds, a headphone equalizer for the obtention of adequate frequency response through the used headphone type, phase and frequency compensation circuitry for the simulation of loudspeaker reproduction by means of headphones and for the undistorted reproduction of eardrum signals, as recorded with binaural probe microphones, two ways of achieving outof-the-head location of sound events, a stereophonic transmitter with corresponding antenna for the cordless connection of additional headphone listeners, provided with suitable stereophonic receiver/amplifiers and antennas of their own, contact transducers, also known as body transducers, for the tactile reproduction of low bass vibrations at various spots of the contact area between the garment and the listener's body, loudness circuitry for the automatic compensation of subjective frequency losses at low volume settings through a given transducer type, tone control circuitry for the timbristic correction of program materials, an automatic cut-off or limiting circuit to protect the listener's auditory organs from harmful headphone amplitudes and shock absorbing spring/mass suspension systems with low-pass damping characteristics for the suspension of the various reproduction devices positioned on the band to protect their high fidelity performance from the interference of shocks and vibrations transmitted from the user's body.

These and other devices are incorporated jointly or alternatively into the most effective and desirable embodiment of the present binaural high fidelity system inasmuch as the reproduction quality and flexibility which they provide is made compatible with a comfortable weight and adequate cost through the use of the latest integrated circuit technology and other miniaturization techniques. Under this condition the preferred embodiment of the disclosed system may further include time delay circuitry for the simulation of room acoustics, and a small size sensor of rotational head movements to be fixed into the headband of the user's headphones with corresponding circuitry placed on the belt in order to allow for the simulation of an immobile listener-independent soundspace in spite of the user's head movements. There may also be included an acoustic cancellation circuit allowing, if wanted, for the cancellation of environmental noise as perceived through the open-air headphones, by using microphone signals of inverted phase. Obviously, and depending on the state of recording and broadcasting technology at the time of construction, the preferred embodiment of the present system may also include various circuits for noise reduction and dynamic expansion of audio signals to assure the most natural sound reproduction of tape and radio programs.

In the preferred embodiment and in accordance with the basic concept of the present invention all parts and assemblies are miniaturized and integrated to the utmost. They are grouped in removable modules which are shaped and distributed along the belt for maximal comfort. The headphones are of a foldable or collapsible type and may be stored on the belt itself. The batteries are of accumulator type and placed in removable containers to be recharged independently from the system, and the outfit may include further containers or support structures for the storage of memory devices like magnetic tape cassettes. Comfort of use is further achieved through the inclusion of automatic program searching devices for the selection of recorded pieces or of radio stations, and of touch buttons and electronic read-outs for easy control.

Adapted to each other and for battery-operated binaural reproduction through a certain type of headphones, adequately miniaturized and shaped for use on the listener's body and incorporated in a supporting and interconnecting garment, the above-mentioned elements combine into a unified apparatus that solves the problem of portable high fidelity and provides a new and unique effect of its own that cannot be obtained by the same parts in their conventional application.

Finally, it should be noted that the present system can be supplemented in its essential functions of portable high fidelity reproduction by other functions provided by additional devices, such as the necessary apparatus for stereophonic sound recording, for the synchronization of such recording with the simultaneous recording of images, for the electronic sound synthesizing of music, for the capturing of the user's physiological parameters (such as brainwaves, heartbeat, or skin resistance) and their conversion into audio signals for biofeedback purposes, for the walkie-talkie type of voice communication, and for the reception of additional radio bands, including television audio signals.

As a stereo system for personal wear, the present invention is most of all characterized by its ability for highly accurate reproduction of stereophonic space determinants, without acoustic isolation, cord attachment, social disturbance or any other incompatibility with the listener's mobility and choice of environments.

NOVELTY OF THE INVENTION

The difference between the sound sensations produced by even the best known radio-cassette portables and those produced by high fidelity systems is so obvious and significant that they must be understood as different media. The reproduction of a piece of music through these two means can be compared, in certain respects, to the reproduction of a film on a T.V. set and in the cinema. The smaller medium represents a well located source inside a wider space, whereas the larger medium is able to fill a whole space with visual or acoustic information. The fullness, detail, and spatial depth of the reproduction and, as concerns audio, its approximation to the original event, are so unlike in the two cases, that different effects are implied sensorially (stimulation), aesthetically (definition), and psychologically (involvement).

It is the task of the present invention to make the high grade reproduction of sound sensations available outside of fixed listening rooms, and generally in an unlimited number of situations and activities, without restricting the listening area or physical comfort of the listener.

The solution is found in a combination of:
(1) a compact high fidelity stereophonic program source including a playback device,
(2) a pair of high fidelity headphone amplifiers adapted for battery operation and optimal reproduction through a given type of headphones,
(3) lightweight and open high fidelity headphones,
(4) miniaturization and anatomic design of said parts, allowing for
(5) incorporation in a supporting and interconnecting garment provided with wiring and
(6) a battery power supply.

The solution is further improved by the inclusion of:
(7) a pair of microphones and microphone amplifiers,
(8) a mixer connected for instant reproduction of live events together with the program source,
(9) binaural equalization circuitry for the manipulation and compensation of the quality, temporal, and local determinants of sound sensations,
(10) a set of bass range contact transducers,
(11) a stereophonic high fidelity transmitter for the cordless connection of additional headphones,

(12) a spring/mass suspension system having damping characteristics that isolate the performance of the high fidelity devices from the interference of mechanical vibrations.

Because all parts are functioning in a new context and combine for an entirely unusual effect, the present system is essentially different from a simple addition of well-known parts, each performing its usual function. Namely, portable stereophonic cassette recorders have not been known in super-compact size, without loudspeakers, on a belt; headphone amplifiers of high fidelity type have not been used in or as battery portables; different kinds of garment have been used to support communication systems with telephone type sound quality (in specialized situations requiring free hands), but not for stereophonic systems nor for the reproduction of stored programs; microphones and mixers have been used with tape recorders for the simultaneous recording of several signal sources, but not for the binaural amplification of live sounds together with a program source; contact transducers are not known as bass-frequency sources acting directly on the human body; cordless headphone systems of stereophonic type are not known with a portable, battery-operated signal source; spring/mass damping systems have not been used to improve the performance of portable stereo equipments.

Functionally adapted in these various respects and integrated into a single whole, the above parts provide a system that represents the first and highly effective solution to the problem of portable high fidelity reproduction. Because it is binaural, the reproduction through such a system can excel the quality of even the best conventional loudspeaker systems, yet it does not have any of the important limitations that characterize other binaural arrangements.

It is a remarkable fact that, in spite of the expansion of high fidelity systems in the last decade and of an accelerated search for novelties, the industry has not been able to find a solution to the problem of portable high fidelity reproduction. Ever smaller high fidelity components have been created, and ever larger stereophonic portables, but such developments are far from making high fidelity reproduction compatible with battery-operation and freedom of movement. High fidelity cassette tape machines and lightweight open air headphones were introduced in the early 1970's, yet neither the industry nor inventors have been able to create the idea of a portable binaural high fidelity system, much less to formulate such a system. The dimensions and operational conditions of existing high fidelity systems, as well as the established categories of technical research, seemed to suggest the impossibility of a viable solution.

Though providing the solution for that problem, the present invention must not be considered as a simple equivalent to previous high fidelity systems, whether constructionally or functionally. Important differences have been observed between
(i) high grade audio reproductions to an unchanging and closed environment with relatively constant visual information, and
(ii) the same reproductions (a) in an open environment and (b) during states of constant motion through a changing environment, without physical restrictions to the listener.

Experiments have shown that situations (a) and (b) remarkably increase the spatial depth of the sound sensations, which become strongly connected to the visual stimulation of the listener and to his motion. The peculiar psychoacoustic and synaesthetic effect of high grade stereophonic reproductions observed in these situations is unknown in the common listening room situation and may be compared, in some respects, to the combination of sounds and images that is known from the cinema.

Similar psychoacoustic effects can be observed from a binaural amplification of the sound events that occur in the environment of a listener, at the moment of their occurrence. Naturally, said events seem to increase in detail and spatial depth, yet they still connect to the visual and tactile elements of the same situation. As a result the total situation, both visual and acoustical, becomes strikingly more stimulating and involving for the listener.

The difference between the present system and conventional stereophonic arrangements can now be summarized as being
(i) of a constructional kind, concerning the use and adaptations of the included parts,
(ii) of a constructional kind, concerning the integration of said parts into a new and unified whole that is able to perform a very new and characteristic function,
(iii) of a functional kind, concerning an unlimited range of applications as compared to previous high fidelity systems, which are limited to reproduction in a single and closed environment,
(iv) of a functional kind, concerning the unusual and striking effect of high fidelity reproductions in open environments and in combination with the visual changes observed by a listener in motion.

The combination of at least three electro-acoustic devices (a stereophonic memory program source, binaural high fidelity reproduction circuitry, light and open high fidelity headphones), chosen and adapted in certain ways with a battery power source, and their incorporation into a supporting and interconnective garment, according to certain principles, as exposed in this patent application, is able to remove a long accepted incompatibility: high fidelity reproduction and free mobility of the listener. It is able, in particular, to project three-dimensional acoustic environments and sound events in high definition for a listener who is himself unrestricted in his mobility and choice of physical environments, thereby creating a new and unique acoustic and audiovisual experience.

BRIEF DESCRIPTION OF THE DRAWINGS

The functional and constructive characteristics of the present invention will become more apparent from the following description, in which reference is made to the accompanying drawings, which illustrate an exemplificative and not limitative embodiment of the garment of the invention for high fidelity stereophonic reproduction, and wherein.

Figure 1:
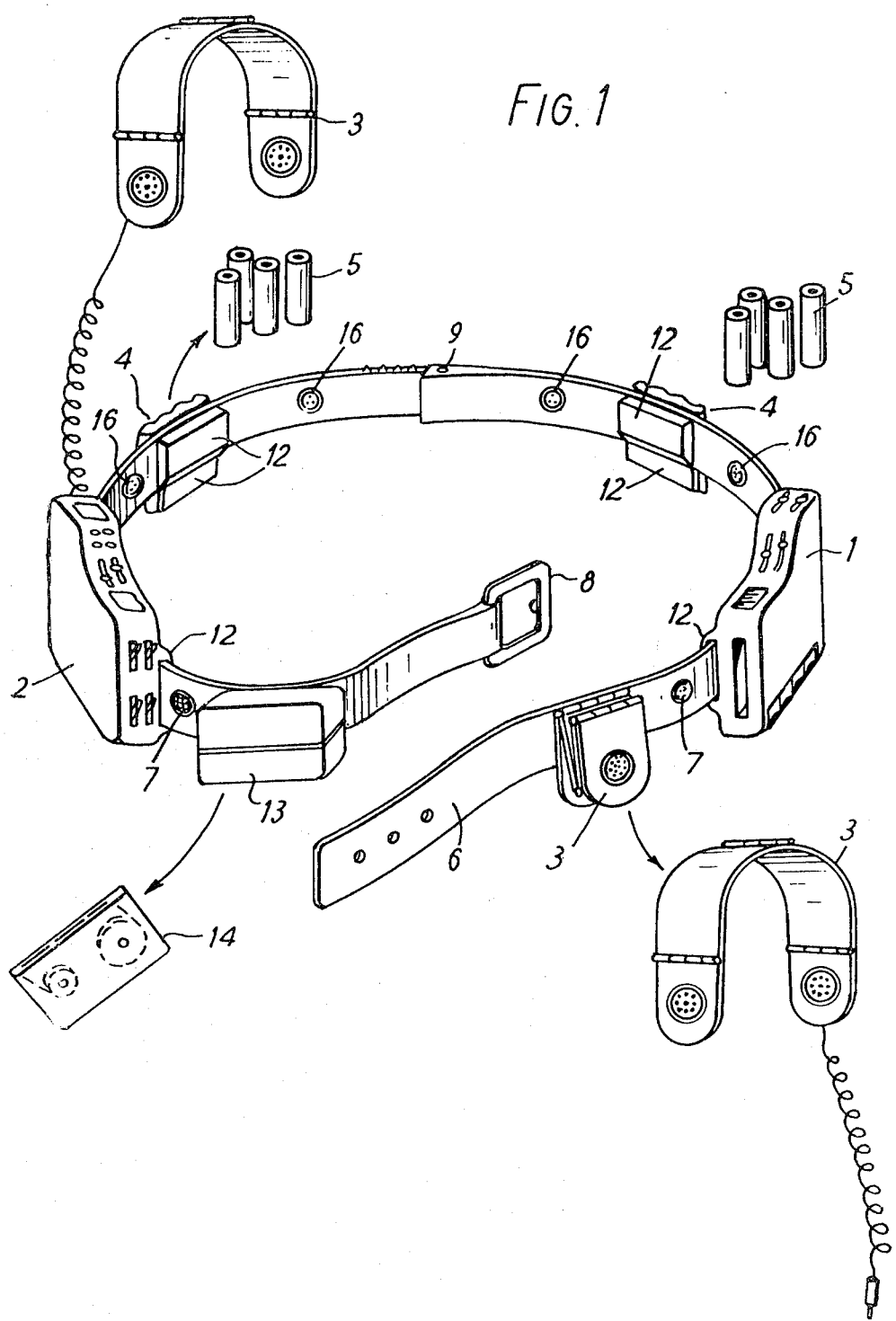
FIG. 1 is a front view of a belt-like garment, equipped with devices for high fidelity stereophonic reproduction.
Figure 2:
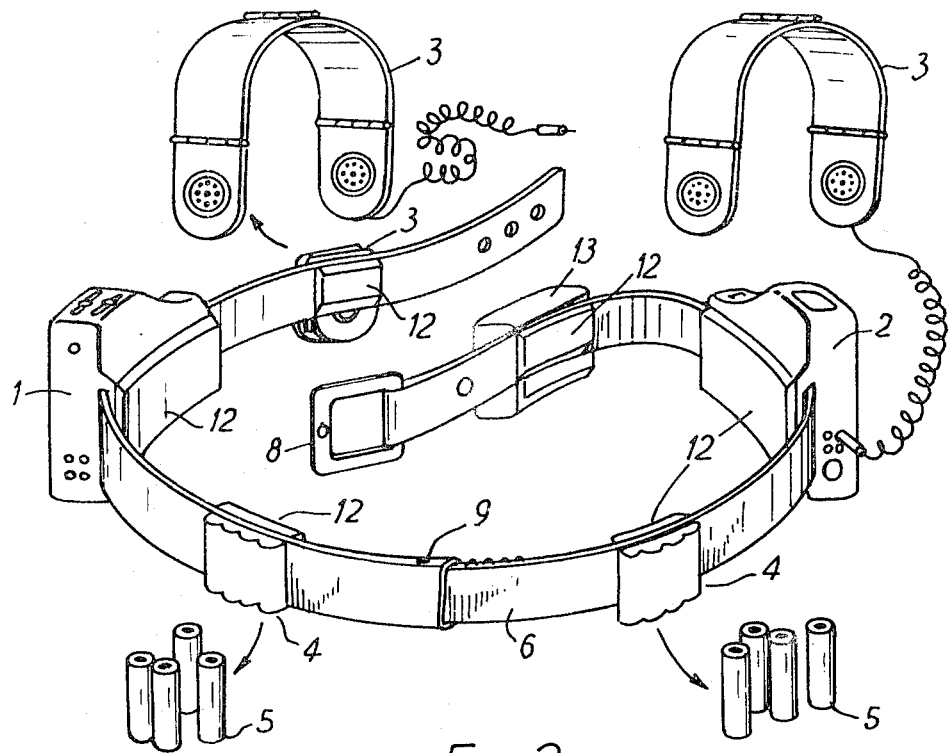
FIG. 2 is a back view of the same garment.
Figure 3:
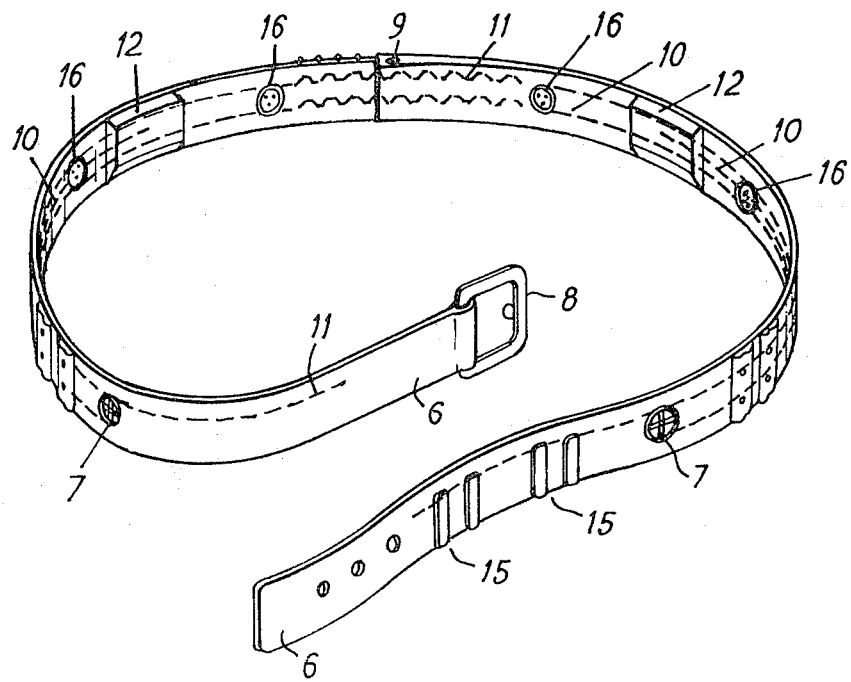
FIG. 3 is a view of the supporting and interconnective band without any of the casings and respective devices.
Figure 4:
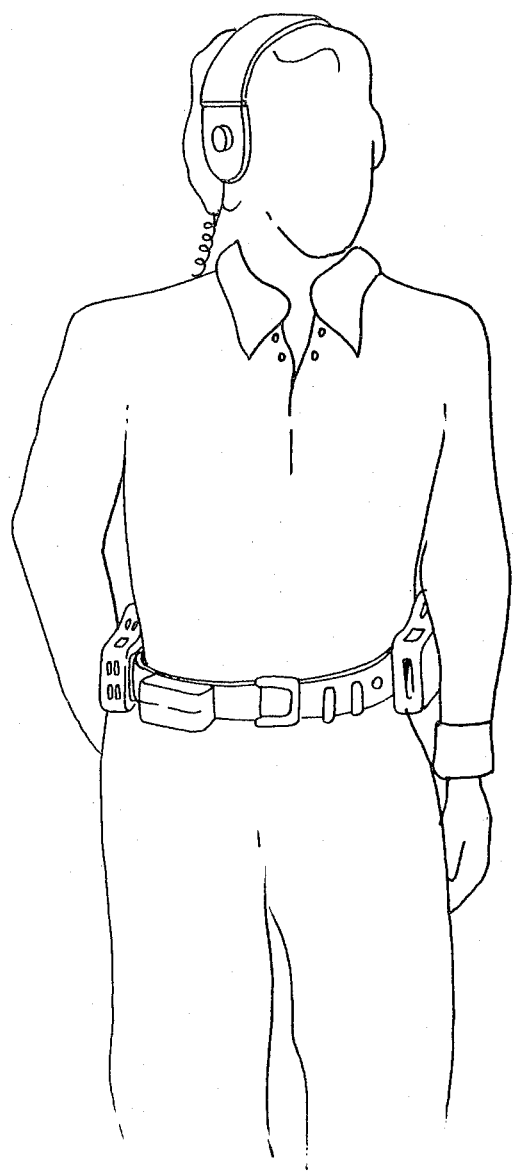
FIG. 4 illustrates an example of application of the present invention.

The garment for high fidelity stereophonic reproduction includes five main parts:
(i) a playback device 1, (ii) a pair of high fidelity headphone amplifiers,
(iii) a pair of high fidelity headphones (or earphones) 3,
(iv) one or more battery casings 4 (containing batteries 5),
(v) a supportive and interconnective band 6.

In the preferred embodiment, at least five other parts are equally important:
(vi) a pair of miniature microphones 7,
(vii) a pair of microphone amplifiers
(viii) four-channel mixing circuitry,
(ix) a high fidelity broadcast FM receiver
(x) an FM stereo decoder The following accessory elements complete the basic arrangement:
(xi) a buckle 8,
(xii) an extensible portion 9,
(xiii) interconnective wiring for signal and power transmission 10,
(xiv) an antenna 11

The invention may further comprise:
(xv) a number of padding cushions 12,
(xvi) a support structure or casing 13 for magnetic tape cassettes 14,
(xvii) another structure 15 to support the headphones 3 in collapsed form,
(xviii) a plurality of contact transducers 16,
(xix) spring/mass damping mechanics for the suspension of the playback device and various circuits.

Naturally, it is understood that the instant belt-like garment be so designed that all its circuits and devices are miniaturized to the utmost and built into the band 6 in a compact and integrative way, and that they may be contained in any number of housings, variously distributed alongside the band.

Referring now to its constituent parts in more detail, the belt-like garment for high fidelity stereophonic reproduction comprises a high fidelity playback device 1 effective to pick up stereophonic audio signals from magnetic tape cassettes 14 or other carriers of recorded audio information (memory devices), and supply them to an output end, which connects to a pair of high fidelity headphone amplifiers 2 by means of wire connections 10, arranged between two layers of the supporting band 6.

The supporting and interconnecting band 6 is made of any flexible material of suitable strength, and it is provided with a buckle 8 or any closing means effective to connect the two belt ends (for instance pressure buttons). The same band is preferably formed with an extensible portion 9, formed by elastic material, slide-in members, or ay other means allowing for contraction and expansion, to provide for exact positioning of the devices 1 and 2 on the left and right waist area of different users. Said devices 1 and 2 are provided with protective casings and have the controls needed for their activation on the surface of these casings, ergonometrically optimized for easy reach of hand and view. The casings are fastened to the supportive and interconnective band 6 by any coupling means adapted to hold them firmly in place, in such a way that the signal and power connection ends of the devices 1 and 2 meet the appropriate wire ends emerging at the outer convex face of the supportive band 6. Said coupling means should preferably be formed as snap-in arrangements to allow for easy removal of the devices from the supportive band. A plurality of padding cushions 12 or a padding strip are located at the inner concave face of the supportive band 6 and at the casing surfaces in direct contact with the user's body to protect it from any pressure of the casings 1, 2, 4, 12, 15, or other rigid parts on the skin. The fixation of the devices 1, 2 and other circuitry, in their respective casings, or the fixation of said casings onto the supportive band, may be obtained with the inclusion of spring/mass damping systems located between the casings and the devices contained therein, or between the coupling parts and all other parts of the devices 1 and 2, or integrated to the coupling parts located on the band 6, wherein said damping systems have low-pass characteristics that adequately isolate the reproduction devices from shocks and vibrations, above a predetermined frequency, originating from the user's bodily movements.

The playback device 1, the headphone amplifiers 2 and all other circuitry that may optionally be included and is referred to below, are adapted for battery operation. The batteries 5, preferably of rechargeable type, are provided in sufficient number and size for the operation of the various devices of the system during a useful length of time, and are located inside of one or more appropriate casings 4, equipped with contact ends and supplying power to the devices through wiring 10, running along or inside the band 6. Alternatively, said batteries may be directly housed inside the casings of the devices 1 and 2.

A dc/dc voltage converter may also be included to increase the voltage of the power supply, if the circuitry of the system is designed to operate at relatively higher voltage while using only a small number of batteries.

The playback device 1 may include its own preamplifying stage, adapted to the characteristics of the pick-up head and to one or several types of signal carrier (memory device), like a cassette type, a miniature disc, or a hologram, which are to be introduced into the playback device 1, preferably by means of a slot-load mechanism. The partially amplified stereophonic signal is delivered, through appropriate output ends, to the wiring 10, which supplies the same signal to the input ends of the headphone amplifiers 2. The playback device 1 may be provided with all capabilities of recent reproduction technology, like automatic program searching, noise reduction circuitry, digital read-outs, etc.

The headphone amplifiers 2 may include a preamplifying stage comprising volume, balance, tone control and switching means, together with a main amplifying stage. The amplifier is provided with one or preferably several headphone outputs, to which one or more pairs of headphones 3 can be connected.

The headphones 3 of lightweight and high fidelity characteristics, are preferably of the "open air" non-isolating type and may include a headband support or be directly fixed to the ears. The headband support is preferably formed with a foldable or collapsible structure.

A short range, high quality stereophonic transmitter, either contained in the same casing of the headphone amplifiers 2, or in a separate casing, may be connected to the preamplifier output to provide for the cordless connection of an unlimited number of headphone pairs 3, each provided with its own pair of receivers and reception antennas, stereophonic amplifier, and power supply. The stereophonic transmitter, included in the belt-like garment, is also connected to an antenna for signal transmission, which may be placed between two layers of the supportive band 6. In that case, the interconnective wiring, which also runs inside the supportive band, as well as any wire connection between power supply and reproduction devices, may be shielded by a protective conduit.

The belt-like garment for high fidelity stereophonic reproduction may also include a plurality of contact transducers 16 distributed alongside the inner face of the supporting band 6, and adapted to the reproduction of bass range signals supplied by the headphone amplifier and transmitted by means of suitable wiring, which runs between two layers of the supportive band. Said contact transducers 16, or body transducers, supply tactile bass sensations to the listener's body. The bass signals may be filtered by a low-pass filter circuit at the amplifier output, and they may be supplied by the left and right program channel to transducers located on the left and right portion of the band 6, respectively, or they may provide from a single channel resulting from the addition of the left and right signal. Additional contact transducers may be positioned at the concave faces of two shoulder stripes, provided with signal conductors, and connected at both ends to the supportive and interconnective band 6.

The headphone amplifier may be replaced by an integrated tuner-amplifier and decoder adapted for the reception and decodification of FM stereo signals, and possibly for the reception of other wave bands, including AM, television audio signals, cordless microphones, and receiver/transmitter bands. The tuner circuitry may include various capabilities of recent development, like automatic program searching, automatic frequency control, automatic stereo/mono blending, noise reduction, frequency synthesizing, electronic read-outs etc. The tuner, or radio receiver, may also consist of a separate unit, which may replace the playback unit 1, or be added to the devices 1 or 2 or positioned elsewhere on the band, preferably by snap-in coupling means, providing for electrical connections to the system.

An FM reception antenna is connected to the detector input of the radio receiver and may be fixed onto the concave face of the supporting band 6 or placed between two layers of said band. All other wiring fixed onto or inside the supporting band 6 may be shielded by a protective conduit. The reception antenna may also run inside a separate strip which may be variously positioned, for instance as a shoulder strip fixed onto the waist band 6 by its two ends and running vertically or diagonally on the user's upper trunk.

In its preferred and most effective embodiment the belt-like garment for high fidelity stereophonic reproduction includes a pair of high quality miniature microphones 7, positioned on the left and right sides of the supportive band 6 (front portion, outer face) or on the left and right casings of the devices 1 and 2, or adjacent to the headphones or on the left and right side of the headphones' headband; two corresponding microphone amplifiers, positioned inside the same casing of headphone amplifiers 2, or adjacently to the microphone capsules 7, or elsewhere onto the band; and a mixing circuit of two-plus-two channels integrated to the preamplifying section of the headphone amplifiers 2; which microphones, microphone amplifiers, and mixing circuitry are adapted to pick up environmental sounds, stereophonically, and allow for their reproduction simultaneously with the program source, in variable proportion, according to the position of a corresponding control, located on the casing of the headphone amplifiers 2.

The interference of environmental noise, as perceived through open-air headphones, may be offset, if wanted, through acoustic cancellation techniques applied to the same noise signals as captured through the microphones.

The preamplifying stage of the headphone amplifiers 2 may be adapted for and provided with a variety of modifying circuits to obtain, for example, the separate control of different portions of the frequency spectrum, the control of the dynamic range of the program signal, noise reduction, and other effects. Automatic loudness compensation may be included to provide for bass and treble compensation at low listening levels, according to the reproduction volume produced by the used headphones 3 at each setting of the volume control. An automatic cut-off or limiting circuit may also be included to prevent reproduction at ear-damaging amplitudes.

The headphone amplification of the preferred and most effective embodiment further include, in particular, a headphone equalizer circuit adapted for the compensation of the headphone frequency response in such a way that an essentially flat frequency response (more exactly a frequency response measured in the ear channels that corresponds to the curve produced by a loudspeaker source having flat free field response) may be obtained at normal and loud listening volumes from the particular headphone type used 3.

A more advanced embodiment may include phase and frequency correction circuitry adapted for the simulation of free field sound projections (as known from typical loudspeaker arrangements) from ordinary sound recordings (as performed with non-binaural microphone technique), also known as loudspeaker simulation, in such a way that in-the-head-location and front-/back inversion of the reproduced sound sensations (as known from ordinary headphone reproduction) is basically eliminated (U.S. Pat. No. 3,920,904). Time delay circuitry may also be included for the simulation of room acoustics characterized by various proportions between direct and reflected sound and various degrees of delay, to further enhance the effect of out-of-the-head location of the reproduced sound events, in spite of the use of headphone reproduction for non-binaural recordings.

The above-mentioned phase and frequency correction circuitry may also be used solely to offset the changes in frequency and phase response produced on the audio signal by the combined headphone/ear system, in order to obtain a signal at the listener's eardrum that corresponds essentially to the recorded program signal, in which case all binaural recordings of audio signals as captured in the ear channels of a living person (by means of probe microphones), or as recorded in the ear channels of an essentially exact imitation of a listener's head (dummy head), will be accurately reproduced at the eardrums of the user of the present belt-like garment, or of other listeners connected to it, in such a way that the spatial imaging of the reproduced sound sensations is highly accurate, concerning any of its parameters (depth, horizontal separation, vertical location, front/back distribution), with regard to the sound sensations obtained by a listener located at the original recording setting in the position of the probe microphone set-up (Gebrauchsmuster 7509223 Federal Republic of Germany).

The present invention may still include another arrangement to offset a well known shortcoming of headphone reproduction, which comprises a small size counterweight sensor of head movements situated at the top of the headband support of the headphones 3 (approximately on the axis of the listener's horizontal head movements) and connected to phase and frequency control circuitry located inside the casing of the amplifiers 2 or in a separate casing to be plugged therein or elsewhere onto the band 6, which means are adapted to simulate a change in the direction of the reproduced sound sensations in such a way that sudden rotational movements of the listener or of the listener's head, on a horizontal plane, are not accompanied by corresponding shifts of the reproduced sound senations, which seem to remain in their original direction and to occupy a stable position in the listener's environment (U.S. Pat. No. 3,962,543).

Other devices may be attached to the belt-like garment as separate plug-in modules, or they may be included in multifunctional embodiments of the two main units 1 and 2. Such additional functions may include an electronic sound synthesizer and/or an electronic rhythm generator, the output signal of which may be routed to the mixing circuit instead of one or two microphone channels or of the recorded or broadcast program source.

A biofeedback system may be similarly connected to the system, being adapted to pick up brainwave, skin resistance, or heart beat signals, from the user's body, through appropriate pick-up means suitably located and connected to a circuit converting them to the audio range and supplying them to the headphone amplifiers 2, either via the mixing circuit or not, for reproduction through the headphones 3. Said biofeedback system allows for the progressive control of some of the listener's physiological variables through auditory monitoring.

The belt-like garment may also include the necessary circuitry to allow for transmitter/receiver communication of any waveband or kind, including the citizen band type of voice communication, wherein the circuits are comprised in a separate unit, to be plugged into the headphone amplifiers 2 or elsewhere into the supporting band 6, or the receiver may be integrated to the broadcast radio receiver and the transmitter to the cordless headphone transmitters mentioned above. The corresponding antenna may run alongside the supportive band 6, possibly between two layers of the band, or it may be attached to or built into a separate shoulder strip; if it is positioned adjacently to any wiring 10, which may represent a source of interference and noise, said wiring can be shielded by a protective conduit.

The present reproduction system may at the same time be a stereophonic recording system, if the playback device 1 is equipped with recording and erasing heads and includes recording circuitry adapted for stereophonic recording of audio signals supplied by the broadcast program source, the microphones 7, or by an auxiliary input.

The microphones also may be of the cordless type, in which case they are provided with a power source, a transmitter circuit, and a transmitting antenna; the corresponding receiver, or two receivers (left and right channel), included in the belt-like garment, may be integrated to the broadcast receiver, or constitute a separate unit, located in any of the casings 1 (together with the playback device) or 2 (together with the mixing circuit), or plugged into these casings, or elsewhere onto the band, with the corresponding antenna running along band 6, or on a separate strip. Otherwise, the microphones 7, either included for direct reproduction, or for sound recording, or for both, may be positioned directly on the supportive band 6, as shown in the drawings, and they may also be detachable, and connected to the microphone amplifiers and the recording and/or mixing circuitry by wire means, or they may be positioned adjacently to the headphones.

The auxiliary input, which may also be connected to the mixing circuit, may be adapted to accept, among other audio signals, the signals generated by electric music instruments, like a battery-operated electronic synthesizer.

The belt-like garment, equipped for stereophonic recording, may be further adapted for the synchronization of live sound recordings with the cinematographic or electronic recording of corresponding live images by separate means, thus including a synchronizing pulse input and output, or a crystal synchronizing pulse generator, and motor speed control means, all situated at the playback device 1, and allowing for pulse-by-pulse speed matching between sound and image recording.

In the present invention the parts and circuits are combined into a unique and highly original arrangement, both physically and electronically, which performs the unprecedent function of providing high fidelity stereophonic reproduction without restrictions to the mobility of the listener. Said parts and circuits are integrated, for the first time, into a battery-operated binaural reproduction system which is bound to the listener's body and provides a solution for all the well known handicaps both of loudspeaker reproduction and of headphone reproduction.

However, the utilization of microphones and mixing circuitry to overcome any kind of acoustic isolation, and of contact transducers in contact with the listener's body to supply tactile bass sensations, are original solutions in their own right, used here for the first time to offset some of the remaining problems of binaural reproduction—independently of their essential contribution to the perfection of the instant garment for hifi reproduction. Obviously, the basic concept of the present reproduction system which implies the placement of the program source, adapted for battery operation, onto the listener's body, is also an original solution to the problem of cord attachment during binaural high fidelity reproduction.

Not all of the circuits mentioned are presently manufactured in a miniaturized form (for instance through the use of very large scale integrated circuits), and not all of them are known in a form that is suitable for battery operation, yet they can be adapted for such operation through the use of well known modifications and manufacturing techniques.

Nevertheless, it is unlikely that even full application of present day miniaturization techniques will allow for the simultaneous inclusion of all of the above mentioned devices without exceeding the limits of comfort and easy application. Any effective embodiment of the present invention may therefore include some of the above mentioned reproduction devices and accessory facilities at the expense of others. Any embodiment will include the basic elements of battery operated binaural high fidelity reproduction, plus a given choice of supplementary equipments, whose number will increase with cost, weight, and technological progress. Such supplementary equipment will either enlarge the number of signal sources or the audio processing capabilities of the basic system. Obviously, an unlimited number of miniaturized and battery operated circuits may be used at any stage, if said circuits are formed as plug-in modules to be included alternatively, rather than simultaneously, in the present belt-like garment for high fidelity reproduction.

The circuits and devices included in the present belt-like garment are preferably arranged as a modular system, each module constituting a separate unit including one or several functions, being provided with snap-in coupling means that allow for fastening to the supporting band 6 equipped with corresponding support structures, or to each other, in such a way that mechanical fixation is achieved together with electrical connection to the signal path and power supply. Said modules provide for flexibility of use in that they may be easily detached and reattached, possibly in a variety of placements allowing for optimal comfort in different sitting and laying positions of the listener, or for check-out and repair operations, or for replacement of one function by another.

The belt-like garment, adapted as a modular system, may also include a second supporting band 6, identical in structure to the first band, provided with a second set of rechargeable batteries and battery casings, so that the listener may connect one band provided with rechargeable batteries to a recharge transformer connected to a mains power source in order to recharge said batteries, while using the other band 6 with the other set of batteries as part of the belt-like garment equipped with the modules for high fidelity stereophonic reproduction.

The circuits and devices of the present reproduction system, or part thereof, either adapted as plug-in modules or not, may be miniaturized to the utmost and fully integrated to the supporting band, so as to form a compact unity with said band, resulting in a single strip without protruding bodies, of sufficient width and thickness to comprehend said circuits and devices formed as plate members and distributed along the band between different layers thereof, while showing the controls and read-outs on its convex face.

Although only one embodiment of the invention has been illustrated in the drawings, various changes in the form and relative arrangement of the parts will now appear obvious to one skilled in the art and may be made without departing from the spirit and scope of the present invention as defined in the appended claims. For instance, although it has been described as adapted to be worn as a belt around the user's waist, other adaptations wherein the system is fastened to the upper trunk of the user may also have utility. Similarly, different memory devices may be used, and changes may be made in other aspects of high fidelity technique, without departing from the basic concept of the present invention.

COMMERCIAL APPLICATIONS

The proposed system offers wide applicability from a combination of high fidelity, low cost and modular flexibility with the elimination of all space restrictions to the reproduction. The widespread contemporary use of high fidelity stereophonic installations and particularly the recent trend toward automobile high fidelity indicates an important need for a system of this kind.

Owing to the particular effect of high quality music reproduction in association with listener's motion states, an important application of the described arrangement lies in reproduction during sport or transportative activities such as skiing, motorcycle riding, car driving.

Ample versatility including domestic and automobile applications make it into an important alternative for any existing high fidelity reproduction system. Realistic sound reproduction and the absence of physical encumbrance and social disturbance also make it into a superior alternative for today's battery-operated stereophonic portables.

The system displays an original and highly effective function during promenades and in the open environment of natural landscapes like a beach, a park, or the mountains. It is equally useful and entertaining for travelling and in holiday situations.

A fulfillment of important needs is also seen in the peculiar fact that the present system can be as effective for private entertainment and isolation from ongoing activities as for socializing and for the shared stimulation given by lifelike reproduction of music and by the stereophonic amplification of real-life sounds and sound environments.

The system can also be used in the hours often lost in public transportation, and its applications include self-instructional activities as much as the recording of messages or spoken correspondence—including real-life background sounds—in stereo. As a ready-to-use recording and monitoring system it is apt to establish the practice of life recording (sound hunting), amplified rehearsing (playing, singing) with or without recording, and stereophonic filming for a wide public that presently avoids the encumbrance of conventional machinery. Quick and inconspicuous mixing, recording and monitoring also make it into an important professional tool—for instance in music, filmmaking, journalism, science. A combination of spoken information with stereophonic music provides further applications in the touristic domain.

Because of its touch-oriented control, fixation to the listener's body, and three-dimensional amplification of surrounding sounds, the invention has additional importance for those restricted to sound and touch owing to handicapped eyesight. It may also be important for people with a weak hearing ability.

Its main and essential function lies, however, in the high fidelity stereophonic reproduction of sound sensations and particularly of music in an unlimited number of environments and situations.

After several decades of high fidelity reproduction, and twenty years of an evergrowing stereophonic industry, no arrangement has been produced or proposed for high quality reproduction independently of a fixed location. The solution for portable high fidelity is found in a particular way of using and combining recent tape recorder technology, headphone technology, binaural reproduction circuitry, integrated circuit techniques, battery operation, and a physical arrangement that ties the equipment to the listener's body in a modular fashion.

The resulting system is highly effective, easy to use, and outstandingly flexible. The described apparatus is particularly original in that it does not just offer a new solution for a known function, but, what is more, establishes essentially a new function. It is the first system to provide high fidelity reproduction outside of closed environments like homes or cars. It is able, in particular, to provide highly accurate projection of three-dimensional sound events for a listener who is neither acoustically isolated nor restricted in his own physical space. It thereby introduces a new auditory and audiovisual experience, to which corresponds a new potential market.

The proposed system has all the advantages of binaural reproduction and none of its well-known disadvantages. It provides the highest reproduction quality and unprecedent flexibility for little cost, energy, and encumbrance, and it opens the way for a variety of innovative uses. For these reasons it is claimed to be superior, in overall effectiveness, to any previous stereophonic reproduction system.

I claim:

1. A personal stereo audio listening system, to be worn by at least one individual listener, comprising the combination of:
   (i) a miniaturized programme source device arranged to produce simultaneous mutually different stereo programme output signals;
   (ii) first miniaturized stereo amplifier means impedance matched to, and connected to receive stereo output signals from said source device;
   (iii) at least one microphone;
   (iv) second miniaturized amplifier means impedance matched to and connected to receive output signals from said at least one microphone;
   (v) miniaturized mixer means impedance matched to and connected to receive output signals from said first and second amplifier means, for mixing of output signls originated simultaneously by said source device and by environmental sounds;
   (vi) stereo third miniaturized amplifier means impedance matched to and connected to receive the outputs of said mixer means;
   (vii) miniaturized open-air type lightweight stereo headphone means impedance and sensitivity matched to and connected to receive the output signals of said third amplifier means;
   (viii) volume adjusting means for the signals received by said headphone means;
   (ix) power source means comprising a battery electrically connected to said first, second and third amplifier means and to said source device and to said mixer means, and
   (x) a support for wear on the body, said support carrying said source device, said first, second and third amplifier means, and said battery power source means.

2. A personal stereo audio listening system, as claimed in claim 1, comprising switch means between said at least one microphone and said mixer means for switching off or reducing signals originated by environmental sounds.

3. A personal stereo audio listening system, as claimed in claim 1, wherein there are at least two microphones, and wherein said second amplifier means is a stereo amplifier.

4. A personal stereo audio listening system, as claimed in claim 3, wherein each said microphone is positioned on at least two said headphone means.

5. A personal stereo audio listening system, as claimed in claim 1, comprising equaliser means to compensate for characteristic frequency and/or directionality distortions of said headphone means.

6. A personal stereo audio listening system, as claimed in claim 1, comprising means for simultaneous connection of more than one said headphone means to receive the stereo output signals of said third amplifier means.

7. A personal stereo audio listening system, as claimed in claim 1, comprising stereo radio receiver means connected to supply stereo output signals to said first amplifier means, said radio receiver means being electrically connected to said power source means and said radio receiver means being carried by said support.

8. A personal stereo audio listening system, as claimed in claim 1, wherein said support is adapted to be secured to the body for non-pendular wear thereon.

9. A personal stereo audio listening system, as claimed in claim 1, wherein said support is adapted to anchor against the body.

10. A personal stereo audio listening system, as claimed in claim 1, wherein said programme source includes plastic or metal wire or tape playback means.

11. A personal stereo audio listening system, as claimed in claim 1, wherein said programme source includes radio receiver means.

12. A personal stereo audio listening system, as claimed in claim 1, wherein the support is a belt.

13. A personal stereo audio listening system, as claimed in claim 12, wherein said source device, said amplifier means, said mixer means and said power source means are provided as modules carried on said belt and wherein there is an electrical interconnection function between said modules.

14. A personal stereo audio listening system, as claimed in claim 1, wherein said support is a shoulder strap or harness for wear.

15. A personal stereo audio listening system, to be worn by at least one individual listener, comprising the combination of:
   (i) a miniaturized programme source device arranged to produce simultaneous mutually different stereo programme output signals;
   (ii) first miniaturized stereo amplifier means impedance matched to, and connected to receive stereo output signals from said source device;
   (iii) at least one microphone;
   (iv) second miniaturized amplifier means impedance matched to and connected to receive output signals from said at least one microphone;
   (v) miniaturized switching and mixer means impedance matched to and connected to receive output signals from said first and second amplifier means, for mixing at any selected desired relative amplitude respective output signals originated simultaneously by said source device and by environmental sounds;
   (vi) stereo third miniaturized amplifier means impedance matched to and connected to receive the outputs of said mixer means;
   (vii) miniaturized open-air type lightweight stereo headphone means impedance and sensitivity matched to and connected to receive the output signals of said third amplifier means;
   (viii) power source means comprising a battery electrically connected to said first, second and third amplifier means and to said source device and to said mixer means, and
   (ix) a support for wear on the body, said support carrying said source device, said first, second and third amplifier means, and said battery power source means.

16. A personal stereo audio listening system, as claimed in claim 1, comprising switch means between said at least one microphone and said mixer means for mixing in any desired variable proportion respective output signals originated simultaneously by said source device and by environmental sounds.

17. A personal stereo listening system, to be worn by an individual listener, comprising the combination of:

(i) a miniaturized reproduction programme source device arranged to produce simultaneous mutually different stereo programme output signals;

(ii) two microphones;

(iii) miniaturized mixer means impedance matched to, and connected to receive output signals from, said programme source device and said two microphones, for mixing of output signals originated simultaneously by said source device and by environmental sounds;

(iv) miniaturized stereo amplifier means impedance matched to, and connected to receive stereo output signals from, said mixer means;

(v) a pair of miniaturized open-air type lightweight stereo headphones impedance and sensitivity matched to, and connected to receive the output signals of, said amplifier means, with said two microphones being each disposed adjacent to a respective one of said headphones;

(vi) volume adjusting means for the signals received by said headphones;

(vii) power source means comprising a battery electrically connected to said programme source device and to said mixer means and to said amplifier means; and (viii) a support for wear on the body, said support carrying said programme source device, said mixer means, said amplifier means, and said battery power source means.

* * * * *